(12) United States Patent
Yang et al.

(10) Patent No.: US 11,996,759 B2
(45) Date of Patent: May 28, 2024

(54) SOLAR POWER GENERATION DEVICE

(71) Applicant: Season Farm Technology Co., Ltd., Tainan (TW)

(72) Inventors: Ching-Chieh Yang, Kaohsiung (TW); Jir Ming Char, Tainan (TW)

(73) Assignee: SEASON FARM TECHNOLOGY CO., LTD., Tainan (TW)

( * ) Notice: Subject to any disclaimer, the term of this patent is extended or adjusted under 35 U.S.C. 154(b) by 171 days.

(21) Appl. No.: 17/612,257

(22) PCT Filed: Sep. 9, 2019

(86) PCT No.: PCT/CN2019/104855
§ 371 (c)(1),
(2) Date: Nov. 18, 2021

(87) PCT Pub. No.: WO2021/046669
PCT Pub. Date: Mar. 18, 2021

(65) Prior Publication Data
US 2022/0239191 A1 Jul. 28, 2022

(51) Int. Cl.
*H02K 7/116* (2006.01)
*F03D 9/11* (2016.01)
(Continued)

(52) U.S. Cl.
CPC .............. *H02K 7/116* (2013.01); *F03D 9/11* (2016.05); *F03D 9/25* (2016.05); *H02J 7/35* (2013.01)

(58) Field of Classification Search
CPC ... H02K 7/116; F03D 9/11; F03D 9/25; H02J 7/35
See application file for complete search history.

(56) References Cited

U.S. PATENT DOCUMENTS
4,718,233 A  1/1988  Barrett

FOREIGN PATENT DOCUMENTS
CN   101328861 A  * 12/2008
CN   202178699 U  *  3/2012
(Continued)

OTHER PUBLICATIONS

CN-202455247-U_translate (Year: 2012).*
(Continued)

*Primary Examiner* — Tulsidas C Patel
*Assistant Examiner* — Mohammed Ahmed Qureshi
(74) *Attorney, Agent, or Firm* — Chun-Ming Shih; LANWAY IPR SERVICES (57) ABSTRACT

A solar power generation device, provided with a power multiplication unit (2). A solar power generator (3) is connected to and located outside of the power multiplication unit (2). The power multiplication unit (2) is provided with a parallel-shaft speed increasing device (21) having a drive shaft (22) on one side and a torsion shaft (23) on the other. The drive shaft (22) is rotatably connected to a motor (24), and the torsion shaft (23) is rotatably connected to a planetary gear torque amplifier (4). The planetary gear torque amplifier (4) is provided with an internal ring gear (41). An inner side of the internal ring gear (41) is connected to a planetary gear set (42) in a circular manner, and a power generator guide shaft (43) is fixedly connected to a side of the planetary gear set (42). The power generator guide shaft (43) is rotatably connected to a power multiplication generator (5), and is provided with planetary gears (422) at one side thereof that mesh with the internal ring gear (41) at an inner side thereof. The torsion shaft (23) is located between the planetary gears (422) and meshes with the same. In this way, the invention solves the problems of high assembly cost, short duration of effective power generation output, (Continued)

and an efficiency decrease caused by consumption after power is generated by a solar panel, thereby extending the effective power generation time.

3 Claims, 7 Drawing Sheets (51) Int. Cl.
    *F03D 9/25*         (2016.01)
    *H02J 7/35*         (2006.01)

(56) References Cited

FOREIGN PATENT DOCUMENTS

| | | | |
|---|---|---|---|
| CN | 102655358 A | | 9/2012 |
| CN | 202455247 U | * | 9/2012 |
| CN | 202455247 U | | 9/2012 |
| CN | 202749997 U | | 2/2013 |
| CN | 203014649 U | | 6/2013 |
| CN | 103867407 A | * | 6/2014 |
| CN | 103867407 A | | 6/2014 |

OTHER PUBLICATIONS

CN-103867407-A_translate (Year: 2014).*
CN-202178699-U_translate (Year: 2012).*
CN-101328861-A_translate (Year: 2008).*

* cited by examiner

SOLAR POWER GENERATION DEVICE

TECHNICAL FIELD

The present application relates to a technical field of solar power generation and, more particularly, to a solar power generation device.

BACKGROUND TECHNOLOGY

Figure 1:
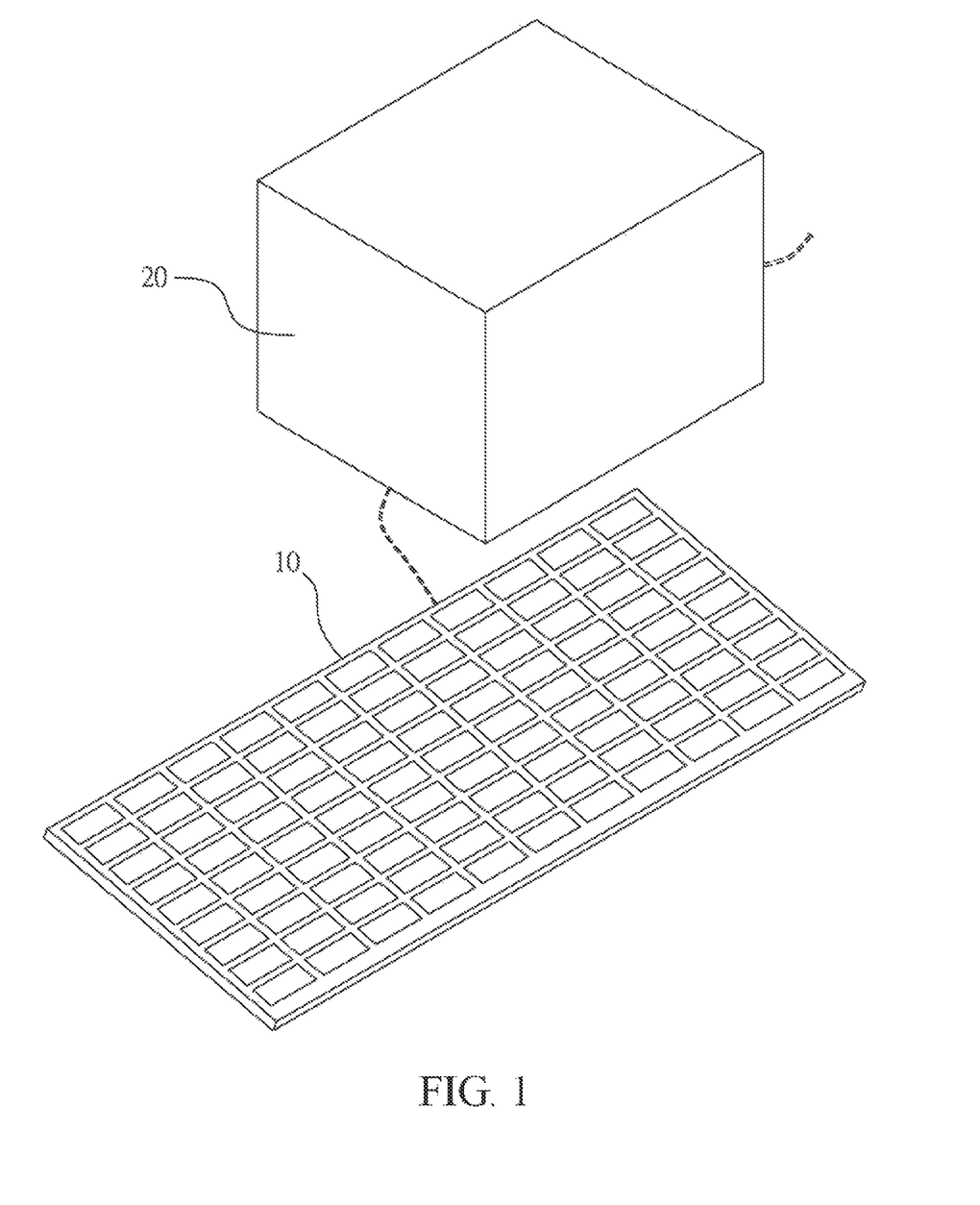
FIG. 1 is a schematic view of conventional solar panels.

Nowadays, operation of the solar energy generation, as shown in FIG. 1, is mostly achieved by paving solar panels 10. It is found that, the field selected for laying the solar panels 10 is very broad, including the mountain, the ocean, the aerospace, the ship, the traffic vehicle on the road, the country, the city building, the river, the desert or the like. Thus, the solar panels 10 that produce a direct-current power can be placed on any land or any area close to the land, so that the solar panels 10 are appliances with a high value, and become generating technology and means with the minimum limit at the present time.

The earth is affected by the rapid climate deterioration, and the agriculture, aquaculture fishery, and animal husbandry of some areas face crop shortage or no harvest, so that the agriculture can mingle the solar power generation to stabilize and increase the income of the farmers, fishers, and herders. According to the statistics, the power generating effect is 28 watts per square meter and per hour. Thus, if the solar power generation is used in the agriculture, the aquaculture fishery, and the animal husbandry with a low output value, it is possible to efficiently solve the livelihood issues of the fanners, fishers, and herders.

But, the solar panels 10 are limited by the present technology, so the solar panels 10 are made to have a large area, and the upper limit of the power generating amount is 300 watts. Then, for satisfying the lower limit requirement of the power generation output of 16.6 kilowatts, at least more than seventeen solar panels 10 are needed so that each of the solar panels 10 has an output of 300 kilowatts under the optimum sunshine condition, to achieve the minimum value. However, the optimum sunshine condition only has 3 to 4 hours per day, so that it is necessary to pave a large number of solar panels 10, so as to simply prolong the power generation output time of the solar panels 10. In addition, the direct-current power of the solar panels 10 have to be converted by an inverter 20 into an alternating-current power to output and supply an electric power. At the same time, the inverter 20 will consume the electric energy, so that the power generation output of the solar panels 10 is reduced (for example: as shown FIG. 1).

But, when the solar panels 10 are arranged largely, the assembly cost is not low. The effective power generation output time of the sunshine is only 3 to 4 hours per day, so that the even power generation output is not steady. The power generation output of the solar panels 10 is reduced by the inverter 20. Thus, it is necessary to think over other method to lift the technology so as to efficiently prolong a steady electric power and to produce a benefit.

CONTENT OF THE INVENTION

The present application is to solve the problems of the present technology, including the assembly cost is not low, the effective power generation output time is short, and mounting a common inverter will reduce and consume the power generation effect of the solar panel.

A solar power generation device of the present application at least comprises a power multiplication unit, the power multiplication unit is at least externally connected with a solar power generating set, the solar power generating set is at least provided with a solar panel, and a storage battery module is at least connected with the solar panel, then, the power multiplication unit is at least provided with a parallel-axis speed increaser, one side of the parallel-axis speed increaser is provided with a drive shaft, and the other side of the parallel-axis speed increaser is provided with a torque shaft, then, the drive shaft is rotatingly connected with a motor which is connected with the storage battery module, the torque shaft is at least rotatingly connected with a planetary gear torque amplifier, the planetary gear torque amplifier is at least provided with an internal ring gear, the internal ring gear has an inner side connected with a planetary gear set in an annular manner, one side of the planetary gear set is securely connected with a power generator guide shaft, the power generator guide shaft is rotatingly connected with and drives a power multiplication generator, the other side of the planetary gear set is at least provided with three planetary gears which intermesh with the inner side of the internal ring gear, each of the planetary gears has side faces secured with torque counterweights, the torque shaft intermeshes between the planetary gears.

Preferably, the power multiplication generator is at least connected with a simple rectifier, the rectifier is at least provided with a feedback lead wire which is connected with the storage battery module.

Preferably, the solar power generating set is at least further provided with a daylight tracking power unit, the daylight tracking power unit has a bottom at least provided with a horizontal rotation power element, the horizontal rotation power element has a top at least connected with a tilt power element, the tilt power element has a top at least provided with a tilting platform, the tilting platform has a top additionally provided with the solar panel.

Preferably, the solar power generating set is at least further provided with a wind power generating element, the wind power generating element is connected with the storage battery module.

The beneficial effect of the present application is in that, the solar panel is connected with the motor, the motor is rotatingly connected with the parallel-axis speed increaser, the parallel-axis speed increaser is rotatingly connected with the planetary gear torque amplifier, the planetary gear torque amplifier is rotatingly connected with and drives the power multiplication generator, then, the torque counterweights of the planetary gear torque amplifier is able to stabilize the power multiplication generator to have a substantial benefit of prolonging the effective power generation output time.

ILLUSTRATION OF THE MARKS IN THE APPENDED DRAWINGS the known technology: 10 solar panel; 20 inverter;

the present application: A container; B vehicle; H sun; 1 solar power generation device; 2 power multiplication unit; 21 parallel-axis speed increaser; 22 drive shaft; 23 torque shaft; 24 motor 3 solar power generating set; 3A daylight tracking power unit; 3A1 horizontal rotation power element; 3A2 tilt power element; 3A3 tilting platform; 3B wind power generating element; 31 solar panel; 32 storage battery module; 4 planetary gear torque amplifier; 41 internal ring gear; 42 planetary gear set; 422 planetary gear; 43 power generator guide shaft 44 torque counterweight; 5 power multiplication generator; 6 rectifier; 61 feedback lead wire.

DETAILED EMBODIMENT

The drawings and the embodiments are associated below to further illustrate the present application, so that the skilled person in this field can better understand and practice the present application, but the examples will not limit the present application.

Figure 2:
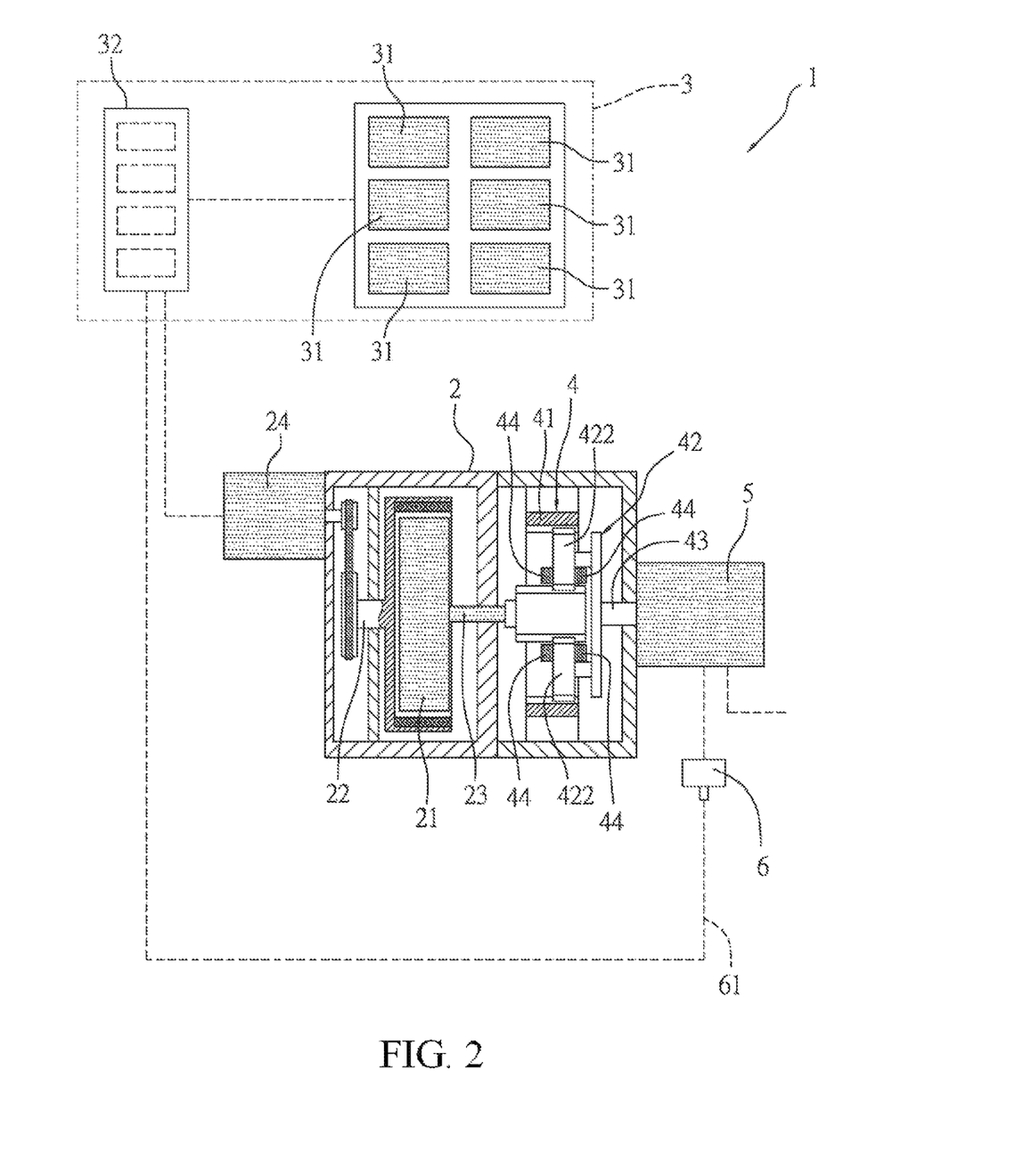
FIG. 2 is a schematic view of a solar power generation device of the present application.
Figure 3:
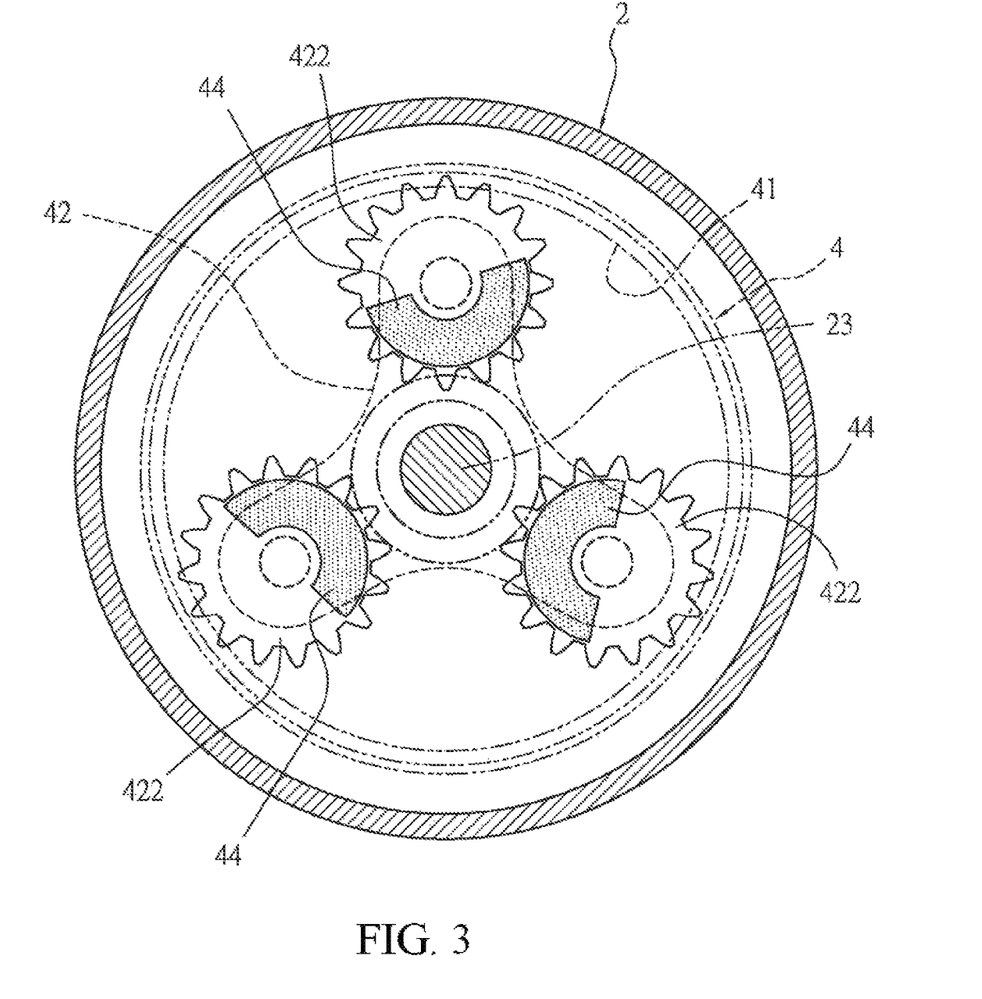
FIG. 3 is a schematic view showing intermeshing of planetary gears of the present application.

The present application refers to a solar power generation device 1, at least comprising a power multiplication unit 2, the power multiplication unit 2 is at least externally connected with a solar power generating set 3, the solar power generating set 3 is at least provided with a solar panel 31 which generates a direct-current power and is connected with a storage battery module 32 which stores the direct-current power produced by the solar panel 31. Then, the power multiplication unit 2 is at least provided with a parallel-axis speed increaser 21, one side (the left side in this embodiment) of the parallel-axis speed increaser 21 is provided with a drive shaft 22, the other side (the right side in this embodiment) of the parallel-axis speed increaser 21 is provided with a torque shaft 23, then, the drive shaft 22 is at least rotatingly connected with a motor 24 which is connected with the storage battery module 32, the motor 24 is driven by the direct-current power stored by the storage battery module 32, and the motor 24 drives the parallel-axis speed increaser 21. Then, the parallel-axis speed increaser 21 drives the torque shaft 23 which is at least rotatingly connected with and drives a planetary gear torque amplifier 4, the planetary gear torque amplifier 4 is at least provided with an internal ring gear 41, the internal ring gear 41 has an inner side at least connected with a planetary gear set 42 in an annular manner, one side (the right side in this embodiment) of the planetary gear set 42 is securely connected with a power generator guide shaft 43, the power generator guide shaft 43 is rotatingly connected with and drives a power multiplication generator 5, the other side (the left side in this embodiment) of the planetary gear set 42 is at least provided with three planetary gears 422 which intermesh with the inner side of the internal ring gear 41, each of the planetary gears 422 has side faces secured with torque counterweights 44, then, the torque shaft 23 intermeshes between the planetary gears 422. The power multiplication generator 5 generates an alternating-current power which directly outputs for use of a power supply, in addition, the power multiplication generator 5 is at least connected with a simple rectifier 6, the rectifier 6 is at least provided with a feedback lead wire 61 which is connected with the storage battery module 32, the feedback lead wire 61 guides a partial electric power generated by the power multiplication generator 5 to recharge the storage battery module 32, to form a self-circulation system of the solar power generation device 1 that prolongs an operation period of the motor 24 (for example: as shown FIGS. 2 and 3).

The present application only needs to assemble six solar panels 31 to achieve a prolonged operation purpose, in use, the solar panels 31 produce an electric power of 1.8 kilowatts, which is stored in the storage battery module 32, the optical energy stored by the storage battery module 32 drives the motor 24 with a direct-current power, only 750 watts are required to drive the motor 24, then, the motor 24 drives the parallel-axis speed increaser 21 with a mechanic energy, whose speed is increased to about 3000 revolutions per hour, the parallel-axis speed increaser 21 then drives the planetary gear torque amplifier 4 with a mechanic energy, the planetary gear set 42 of the planetary gear torque amplifier 4 drives the planetary gears 422 which drive the power generator guide shaft 43 whose speed is slowed down to 800 revolutions per hour, and the power generator guide shaft 43 is rotatingly connected with and drives the power multiplication generator 5 to at least generate an alternating-current power of about 6 kilowatts instantaneously. In addition, the planetary gears 422 store the energy and stably support the rotation speed of the power generator guide shaft 43 according to the weight of the torque counterweights 44, to ensure that the power multiplication generator 5 driven by the power generator guide shaft 43 is able to produce a gain and to generate an alternating-current power that directly supplies an electric power externally. Then, a partial electric power generated by the power multiplication generator 5 is directed by the feedback lead wire 61 to recharge the storage battery module 32, so that the storage battery module 32 supplies the motor 24, to form a self-circulation system that prolongs an operation period (for example: as shown FIGS. 2 and 3).

The electric power of 6 kilowatts produced by the power multiplication generator 5 of the present application can directly output 5 kilowatts of electric power. In addition, the rectifier 6 keeps 1 kilowatts of electric power which passes the feedback lead wire 61 and is stored in the storage battery module 32, to supply and aid the motor 24 which is able to operate more than eight hours per day during the power generating process. Then, it is found that the six solar panels 31 produce an electric power of 1.8 kilowatts, which is increased by the power multiplication unit 2 to 6 kilowatts, and the motor 24 is a machine that is able to operate by a weak current, so that the solar power generation device 1 still has an excellent efficiency when not being operated under the optimum sunlight irradiating condition, so it is known that, the solar power generation device 1 contains the storage battery module 32 to store the electric energy, so that the solar power generation device 1 is at least able to operate more than eight hours per day under a high usage, to form a self-circulation system of the solar power generation device 1 that prolongs an operation period of the motor 24 (for example: as shown FIG. 2).

Figure 4:
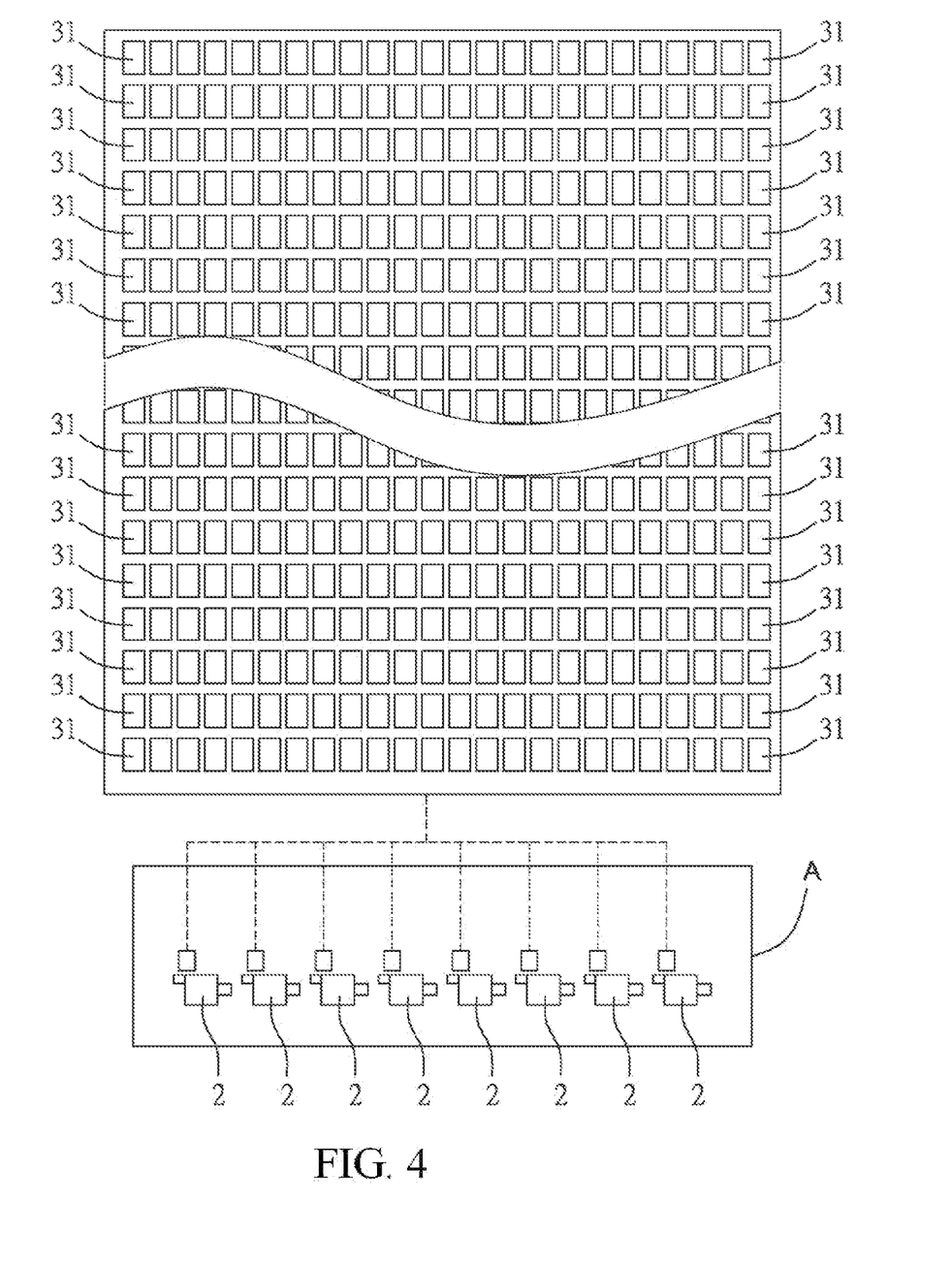
FIG. 4 is a schematic view of a large-scale usage of the solar power generation device of the present application.

The power multiplication units 2 of the present application are placed and arranged in a container A, and are assembled in the container A, then to cooperate with the solar panels 31 which are laid in a large area, or the power multiplication units 2 of a large number are set to use with the solar panels 31 which are laid in a large area (for example: as shown FIG. 4).

Figure 5:
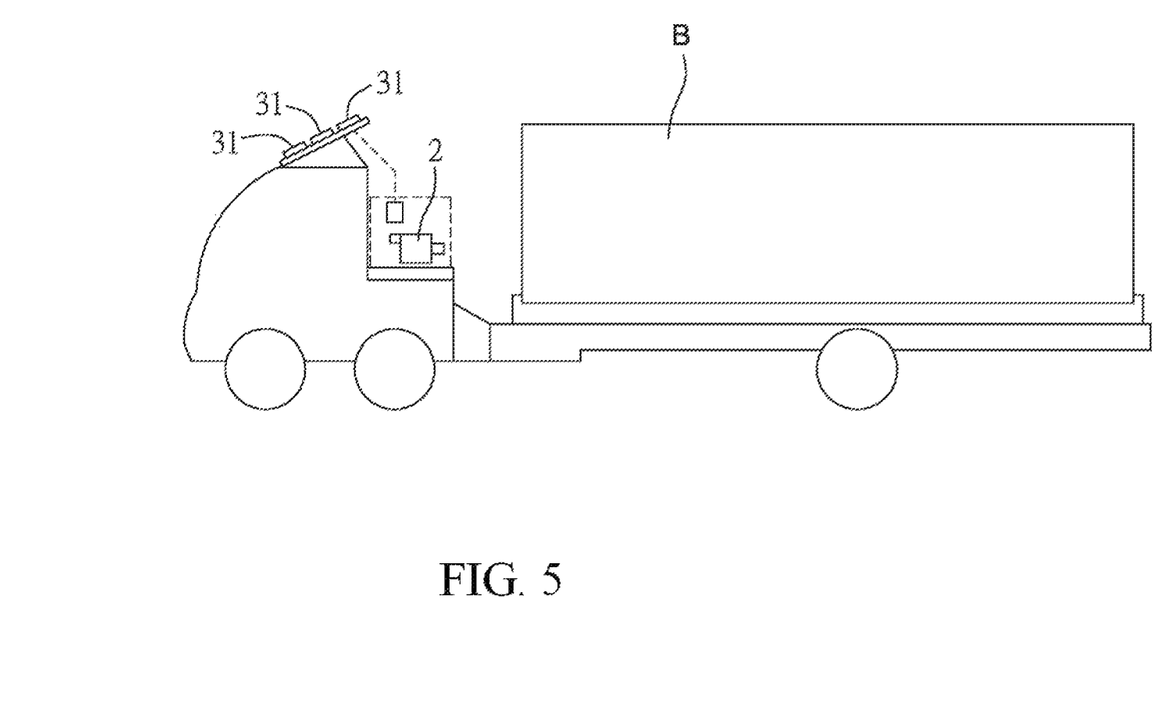
FIG. 5 is a schematic view of a vehicle loaded usage of the solar power generation device of the present application.

Further, the power multiplication unit 2 of the present application is used and provided on a vehicle B with high power consumption, the vehicle B has an interior provided with the power multiplication unit 2 and the storage battery module 32, and has an exterior provided with the solar panels 31, the electric energy generated by the power multiplication unit 2 is supplied to the vehicle B for use, thereby efficiently reducing the burden of the engine generation of the vehicle B, and thereby saving the fuel consumption of the engine of the vehicle B. Then, the solar power generation device 1 of the present application is almost available for the current traffic tools (for example: as shown FIG. 5).

Figure 6:
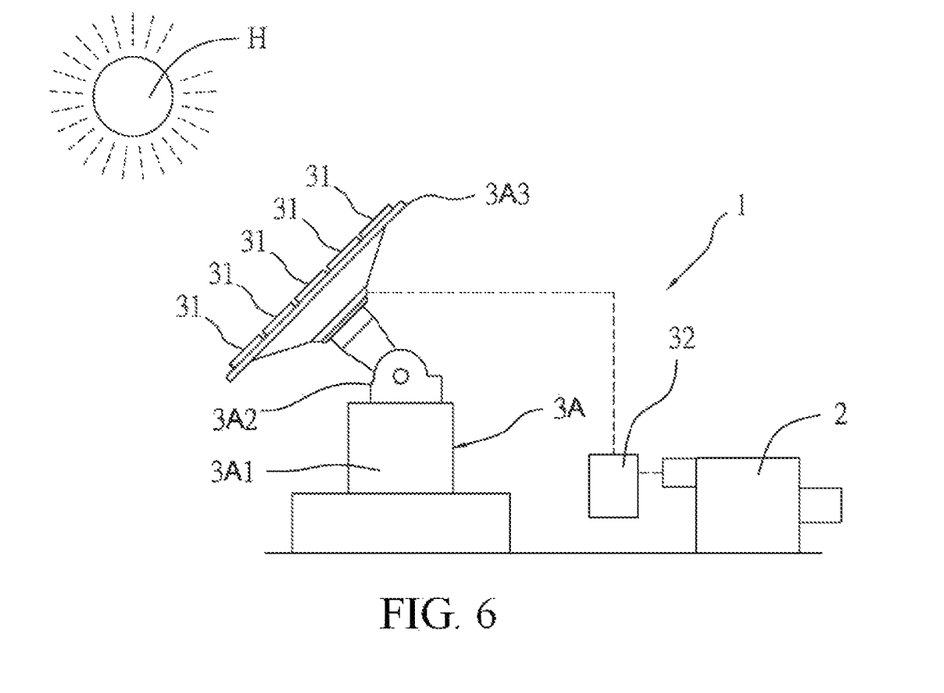
FIG. 6 is a schematic view of combination of a daylight tracking power unit of the present application.

The solar power generating set 3 of the present application is at least further provided with a daylight tracking power unit 3A, the daylight tracking power unit 3A has a bottom at least provided with a horizontal rotation power element 3A1, the horizontal rotation power element 3A1 has a top at least connected with a tilt power element 3A2, the tilt power element 3A2 has a top at least provided with a tilting platform 3A3, the tilting platform 3A3 has a top additionally provided with the solar panels 31. Thus, the daylight tracking power unit 3A keeps the solar panels 31 directed toward the sun H, so that the solar power generation device 1 is able to generate electricity successively during eight hours, and the sun H drives the solar power generation device 1 which uses a weak current to drive the motor 24, and simply using the weak light of the sun H and a small amount of light passing the cloud in the daytime can satisfy the requirement of the solar power generation device 1 for generating an electric power, so performance of the present application is not limited to the effective generating output time of the sunshine of the sun H which is three to four hours per day (for example: as shown FIG. 6).

Figure 7:
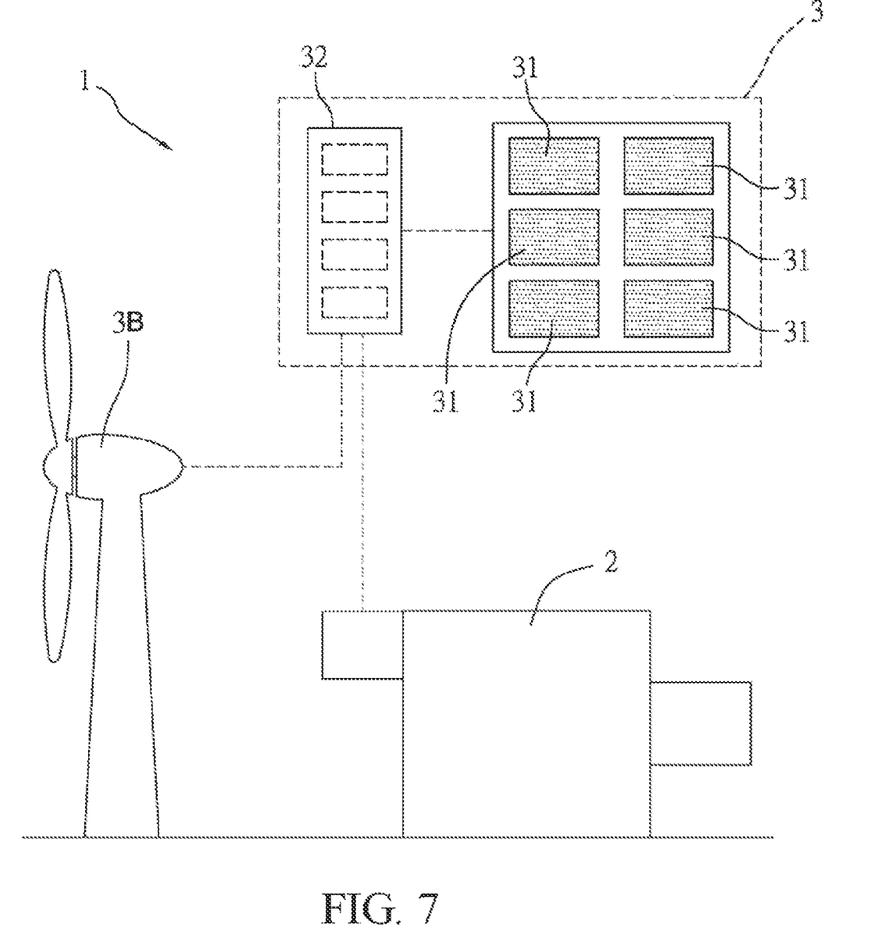
FIG. 7 is a schematic view of combination of a wind power generating element of the present application.

The solar power generating set 3 of the present application is at least further provided with a wind power generating element 3B, the wind power generating element 3B is connected with the storage battery module 32. Thus, the solar power generation device 1 is operated and prolonged to the nighttime by using the wind power generating element 3B, and assures power generation and power output at any weather condition (for example: as shown FIG. 7).

It is known from the above descriptions that, the electric power of the direct-current optical energy generated by the solar panels 31 of the solar power generation device 1 is stored in the storage battery module 32, the electric power of the direct-current optical energy stored by the storage battery module 32 is used to drive the motor 24, only 750 watts are required to drive the motor 24, then, the motor 24 drives the parallel-axis speed increaser 21 with a mechanic energy, whose speed is increased, the parallel-axis speed increaser 21 then drives the planetary gear torque amplifier 4 with a mechanic energy, the planetary gear set 42 of the planetary gear torque amplifier 4 drives the planetary gears 422 which drive the power generator guide shaft 43 whose speed is slowed down, and the power generator guide shaft 43 is rotatingly connected with and drives the power multiplication generator 5 to produce a gain and to generate an alternating-current power that directly supplies an electric power externally. In addition, the planetary gears 422 store the energy and stably support the rotation speed of the power generator guide shaft 43 according to the weight of the torque counterweights 44, to ensure the generating benefit of the power multiplication generator 5 driven by the power generator guide shaft 43, thus, to ensure persistence and stability of the electric power generated by the generator 4, and to entirely eliminate the drawbacks of the present technology in which the assembly cost is not low and the effective power generation output time is short, and needs not to mount a common inverter that reduces and consumes the power generation effect, then, the solar power generation device 1 lets the agriculture, fishery, and farming mix with the solar energy generation to achieve the stability and to increase the benefit of the farmers, fishers, and herders, then, the rectifier 6 of the solar power generation device 1 is provided with the feedback lead wire 61 which is connected with the storage battery module 32, the feedback lead wire 61 guides a partial electric power generated by the power multiplication generator 5 to recharge the storage battery module 32, to form the self-circulation system of the solar power generation device 1 that prolongs the operation period of the motor 24, and the self-circulation system of the present application incorporates the solar power generating set 3 and the power multiplication unit 2 to construct the preferable advantage of the present application.

The abovementioned embodiment is only a preferred embodiment that fully illustrates the present application, the protected range of the present application is not limited to it. The replacement or change made by a skilled person in this field on the basis of the present application will fall within the protected scope of the present application. The protected scope of the present application is based on the claims.

INDUSTRIAL APPLICABILITY

The solar panel 31 of the present application is connected with the motor 24, the motor 24 is rotatingly connected with the parallel-axis speed increaser 21, the parallel-axis speed increaser 21 is rotatingly connected with the planetary gear torque amplifier 4, the planetary gear torque amplifier 4 is rotatingly connected with and drives the power multiplication generator 5, then, the torque counterweights 44 of the planetary gear torque amplifier 4 is able to stabilize the power multiplication generator 5 to have a substantial benefit of prolonging the effective power generation output time, and to be made and used in the industry, thus, there is industrial applicability.

The invention claimed is:

1. A solar power generation device, wherein, at least comprising a power multiplication unit, the power multiplication unit is at least externally connected with a solar power generating set, the solar power generating set is at least provided with a solar panel, and a storage battery module is at least connected with the solar panel, then, the power multiplication unit is at least provided with a parallel-axis speed increaser, one side of the parallel-axis speed increaser is provided with a drive shaft, and the other side of the parallel-axis speed increaser is provided with a torque shaft, then, the drive shaft is rotatingly connected with a motor which is connected with the storage battery module, the torque shaft is at least rotatingly connected with a planetary gear torque amplifier, the planetary gear torque amplifier is at least provided with an internal ring gear, the internal ring gear has an inner side connected with a planetary gear set in an annular manner, one side of the planetary gear set is securely connected with a power generator guide shaft, the power generator guide shaft is rotatingly connected with and drives a power multiplication generator, the other side of the planetary gear set is at least provided with three planetary gears which intermesh with the inner side of the internal ring gear, each of the planetary gears has side faces secured with torque counterweights, the torque shaft intermeshes between the planetary gears;

the solar power generating set is at least further provided with a daylight tracking power unit, the daylight tracking power unit has a bottom at least provided with a horizontal rotation power element, the horizontal rotation power element has a top at least connected with a tilt power element, the tilt power element has a top at least provided with a tilting platform, the tilting platform has a top additionally provided with the solar panel.

2. The solar power generation device as said in claim 1, wherein the power multiplication generator is at least connected with a simple rectifier, the rectifier is at least provided with a feedback lead wire which is connected with the storage battery module.

3. The solar power generation device as said in claim 1, wherein the solar power generating set is at least further provided with a wind power generating element, the wind power generating element is connected with the storage battery module.

\* \* \* \* \*